United States Patent [19]

Betz et al.

[11] Patent Number: 4,539,231

[45] Date of Patent: Sep. 3, 1985

[54] METHOD FOR SEALING A CERAMIC MOLDING

[75] Inventors: Wolfgang Betz; Werner Hüther, both of Munich, Fed. Rep. of Germany

[73] Assignee: Motoren- und Turbinen-Union Munchen GmbH, Fed. Rep. of Germany

[21] Appl. No.: 503,196

[22] PCT Filed: Jun. 1, 1978

[86] PCT No.: PCT/DE78/00001

§ 371 Date: Apr. 16, 1979

§ 102(e) Date: Apr. 16, 1979

[87] PCT Pub. No.: WO79/00101

PCT Pub. Date: Mar. 8, 1979

[30] Foreign Application Priority Data

Aug. 18, 1977 [DE] Fed. Rep. of Germany ....... 2737173

[51] Int. Cl.$^3$ .............. B05D 1/18; B05D 3/00; C23C 11/00; C23C 13/00
[52] U.S. Cl. .................... 427/255; 427/294; 427/299; 427/430.1
[58] Field of Search ............ 427/255, 294, 430.1, 427/255.4, 344, 299

[56] References Cited

U.S. PATENT DOCUMENTS 4,230,745  10/1980  Betz et al. ............. 427/255 X

FOREIGN PATENT DOCUMENTS 0006892  6/1978  European Pat. Off. .
1646796  9/1971  Fed. Rep. of Germany .
2349277  4/1975  Fed. Rep. of Germany .
2258921  8/1975  France .

OTHER PUBLICATIONS

Inomata, Y., "Silicon Nitride Sintered Body with Silicon Coating", Chemical Abstracts, vol. 84, No. 20, p. 290, col. 1, May 17, 1976.

*Primary Examiner*—Michael R. Lusignan
*Attorney, Agent, or Firm*—Scully, Scott, Murphy & Presser

[57] ABSTRACT

The present invention provides a method for encapsulating a ceramic moulding, preferably a silicon ceramic moulding such that the encapsulated mouldings can be subjected to hot isostatic pressing without causing the pressure-transfer medium to penetrate into the pores of the moulding. Encapsulation is achieved by first evacuating the moulding, then filling it with nitrogen gas and thereafter immersing it in a silicon (Si) melt. In a preferred aspect the moulding is filled with nitrogen gas under positive pressure. Once the silicon melt has been deposited, pressure can be allowed to act on it externally.

10 Claims, No Drawings

METHOD FOR SEALING A CERAMIC MOLDING

BACKGROUND OF THE INVENTION

1. Field of the Invention

This invention relates to a method for sealing a ceramic molding, especially a silicon ceramic molding, for hot isostatic pressing. In the hot isostatic pressing (HIP) process, porous mouldings of a silicon ceramic material are compressed under high pressure acting all around and under high temperature. Hot isostatic pressing reduces the porosity of the moulding and so improves its mechanical strength at elevated temperatures as well as its resistance to oxidation. The pressures used in hot isostatic pressing run in the vicinity of 3000 bars, the temperatures at about 1750° C. Use is normally made of a gas as a medium to transfer the pressure. In order to keep this gas from penetrating into the pores of the molding, the latter requires encapsulating.

2. Discussion of the Prior Art

Encapsulation is currently being practiced such that the ceramic molding is enclosed in an evacuated glass can which turns viscous during hot isostatic pressing to hug the ceramic molding as a layer of glass.

With this known method for encapsulating the ceramic molding, the glass layer threatens to penetrate into the pores of the molding. Should the melting glass exhibit too low viscosity during hot isostatic pressing, the strength of the molding may be compromised at its surface zone. Another risk is that the glass, if of low viscosity, may penetrate into the pores of the molding to an extent where the glass envelope will intimately unite with the molding such that when the glass envelope is being removed after hot isostatic pressing, damage to the ceramic molding cannot be avoided especially if it is a complex, thin-walled shape. On the other hand there is the risk that the glass can, when melting during hot isostatic pressing, and the resulting glass layer hugging the ceramic moulding have excessive viscosity and deform the moulding, which should definitely be avoided.

U.S. Pat. No. 4,230,745 discloses a method of encapsulating a molded ceramic member wherein the molded member is first filled with $N_2$, and then coated with a dense surface coating of Si melt and thereafter exposed to an $N_2$ atmosphere until the Si coating is converted into a $Si_3N_4$ coating. In contrast, the present invention provides a method of sealing a ceramic molding without forming a surface layer of glass to encapsulate the molding. The pores are sealed with plugs of $Si_3N_4$. This improvement retains the original geometric shape, eliminates the possibility of a mistake in forming an external layer, and the possibility of trapping the metallic silicon residue between the coating and the molding.

SUMMARY OF THE INVENTION

In a broad aspect the present invention provides a method for sealing a ceramic molding to seal out the pressurized gas while maximally retaining the original geometric shape of the ceramic molding.

It is a particular object of the present invention to provide a method in which the molding is first evacuated and then filled with nitrogen gas before it is immersed in a silicon melt.

DISCUSSION OF THE PREFERRED EMBODIMENTS

Immersion of the molding in the silicon melt causes liquid silicon to penetrate into the pores of the molding and to react with the nitrogen gas in the molding to form $Si_3N_4$. The resulting $Si_3N_4$ plugs seal the pores and give the molding a gas-tight surface permitting compression by hot isostatic pressing.

In a preferred aspect of the present invention the molding and the melt are heated to a temperature of 1400° C. to 1800° C. before immersion to ensure adequate wetting of the moulding with the liquid silicon.

In a further aspect of the present invention the molding is filled with pressurized nitrogen, which measure serves to inject a maximum amount of nitrogen gas into the molding, permitting maximum growth of the $Si_3N_4$ plugs after the silicon melt has penetrated.

In a preferred aspect of the present invention the pressure on the silicon melt is raised steadily after immersion of the molding, causing the developing $Si_3N_4$ skin within the pores to be ruptured continually and to be formed anew farther into the pores.

In a further aspect of the present invention the pressure on the silicon melt is raised and lowered periodically upon immersion of the molding. This causes the $Si_3N_4$ skin within the pores to be ruptured continually until the fragments grow together to form a solid plug. This latter method enables thicker $Si_3N_4$ plugs to be produced than with the method of the former aspect. Another parameter immediately governing the thickness of the $Si_3N_4$ plugs is the pressure at which the nitrogen is forced into the still porous molding. The higher the pressure selected, the more plentiful the supply of nitrogen in the molding and the thicker the $Si_3N_4$ plugs.

What is claimed is:

1. Method for sealing a ceramic molding without encapsulating or forming a surface layer, especially a silicon ceramic molding for hot isostatic pressing, characterized in that the molding is first evacuated and then filled with nitrogen gas ($N_2$) before it is immersed in a silicon melt, said immersion thereby forming $Si_3N_4$ plugs within the pores to seal the pores and thereby obviate the need for a surface layer coating before said isostatic pressing.

2. Method of claim 1, characterized in that the molding and the melt are heated to a temperature of 1400° C. to 1800° C. before immersion.

3. Method of claim 1 or 2, characterized in that the filling of the molding is achieved using pressurized nitrogen gas ($N_2$).

4. Method of claim 1 or 2, characterized in that the pressure on the Si melt is steadily raised upon immersion of the molding.

5. Method of claim 1 or 2, in which the moulding is filled with pressurized nitrogen gas ($N_2$), characterized in that the pressure acting on the silicon melt is raised steadily upon immersion of the molding.

6. Method of claim 1 or 2, characterized in that the pressure acting on the silicon melt is raised and lowered periodically upon immersion of the molding.

7. Method of claim 1 or 2, in which the molding is filled with $N_2$ under positive pressure, characterized in that the pressure acting on the Si melt is raised and lowered periodically upon immersion of the molding.

8. A method of sealing a silicon ceramic molding without encapsulation to protect it during hot isostatic pressing, said method comprising:
(a) evacuating the molding,
(b) filling the molding with nitrogen gas ($N_2$), and then
(c) immersing the nitrogen filled molding in a silicon melt,
whereby the silicon melt reacts with nitrogen gas within the pores of the molding to form $Si_3N_4$ plugs that close and seal the pores of the molding during subsequent hot isostatic pressing, without forming a surface layer of $Si_3N_4$ around the molding.

9. A method according to claim 1 further characterized by the step of maintaining the surface of the molding substantially free of $Si_3N_4$ as the $Si_3N_4$ plugs are formed in the pores of the molding.

10. A method according to claim 8 further comprising the step of maintaining the outside surface of the molding substantially free of $Si_3N_4$ during the immersing step.

* * * * *